United States Patent [19]
Bessette

[11] 3,762,164
[45] Oct. 2, 1973

[54] AUTOMOTIVE TRANSMISSION

[76] Inventor: Georges Henri Bessette, 209 Boulevard du Seminaire, Saint-Jean, Quebec, Canada

[22] Filed: Mar. 17, 1972

[21] Appl. No.: 235,678

[52] U.S. Cl. .................................. 60/425, 418/200
[51] Int. Cl. .......................................... F16h 39/48
[58] Field of Search .................. 60/425, 427, 431; 74/431; 180/70; 418/200

[56] References Cited
UNITED STATES PATENTS

| | | | |
|---|---|---|---|
| 1,792,306 | 2/1931 | Jacker | 60/425 |
| 2,374,588 | 4/1945 | Doran | 60/425 |
| 2,839,889 | 6/1958 | McGill | 60/425 |

Primary Examiner—Edgar W. Geoghegan
Attorney—Raymond A. Robic

[57] ABSTRACT

A transmission to interconnect a driving shaft and a driven shaft including a casing mounted on both shafts and having two fluid-tight gear cases each housing a pair of gears meshing with one another. Each pair of gears defines with the respective case an inlet and an outlet cavity at the meshing station. One gear of one pair is mounted on the driving shaft to be rotated thereby while one gear of the other pair is mounted on the driven shaft to rotate it. The remaining gears are mounted on an intermediate shaft for rotation in unison. A closed hydraulic circuit interconnects the inlet and outlet cavities and includes a pressure control valve and is so constructed and arranged that operation of the valve controls the pressure condition in the cavities to control the condition of application of the driving torque on the driven shaft.

7 Claims, 9 Drawing Figures

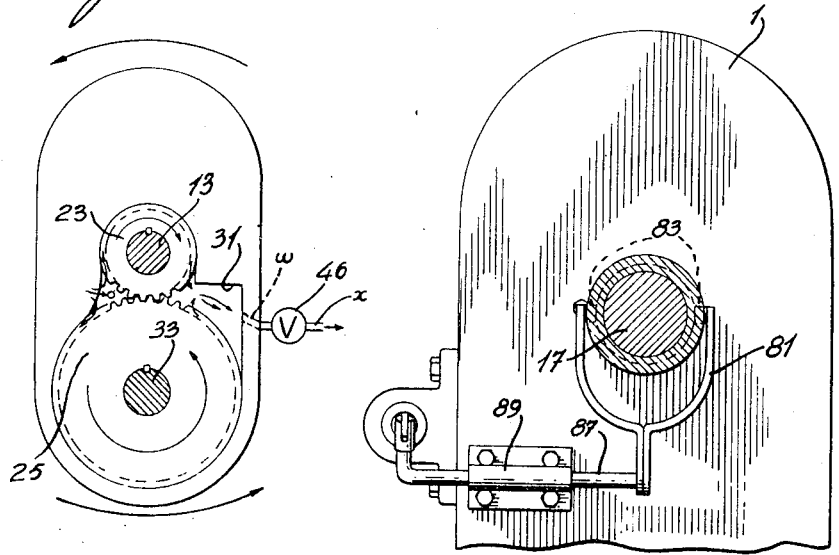
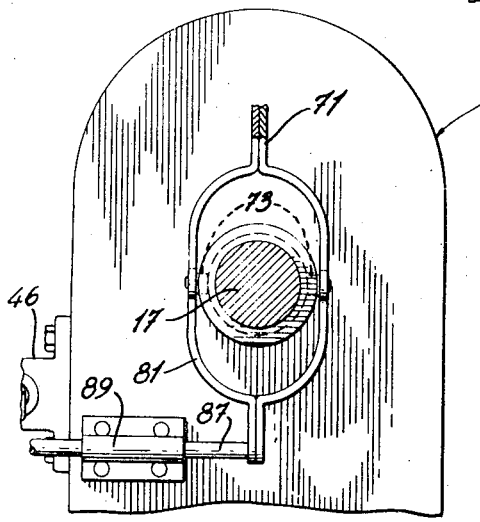
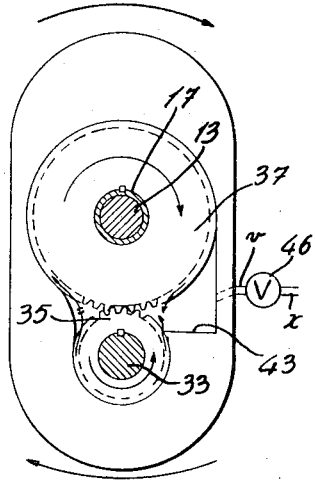
Fig. 5
Fig. 6
Fig. 7
Fig. 8

AUTOMOTIVE TRANSMISSION

The present invention relates to an automotive transmission intended to transmit a torque from a driving to a driven shaft.

An object of the present invention is to provide a transmission that will have the positive action of the gear-type transmission while having the smoothness of a hydraulic transmission when starting up or when changing the torque ratio between the shafts.

Another object of the invention lies in the provision of a transmission which eliminates the need for a clutch and the shifting of gears and wherein torque is smoothly applied to the driven shaft without the usual harsh mechanical action.

These objects can be obtained with a transmission made according to the invention which includes a casing mounted on both shafts and having two fluid-tight gear cases each housing a pair of gears meshing with one another. Each pair of gears defines with the respective case an inlet and an outlet cavity at the meshing station. One gear of one pair is mounted on the driving shaft to be rotated thereby while one gear of the other pair is mounted on the driven shaft to rotate it. The remaining gears are mounted on an intermediate shaft for rotation in unison. A closed hydraulic circuit interconnects the inlet and outlet cavities and includes a pressure control valve and is so constructed and arranged that operation of the valve controls the pressure condition in the cavities to control the condition of application of the driving torque on the driven shaft.

In a preferred embodiment of the invention, the hydraulic circuit comprises a hydraulic tank to which are connected a feeding conduit leading from the tank and interconnecting the inlet cavities and a return conduit interconnecting the outlet cavities and the valve, on the one hand, and the valve and the tank, on the other hand. The valve is formed of a body having a cylindrical bore into which a piston is mounted for sliding displacement in the bore. The aforesaid return conduit includes passages in the body that lead into the bore and a duct in the piston so constructed and arranged as to allow the piston, by sliding displacement thereof, selectively to control flow of hydraulic fluid between the cavities and the tank. The piston is connected to a manually operable assembly suitable to cause its sliding in the cylinder to operate the valve.

It is believed that a better understanding of the invention as well as other features thereof will be afforded by the description that follows of a preferred embodiment having reference to the appended drawings wherein:

FIG. 5 is a side elevation view of one of the gear cases;

Figure 2:
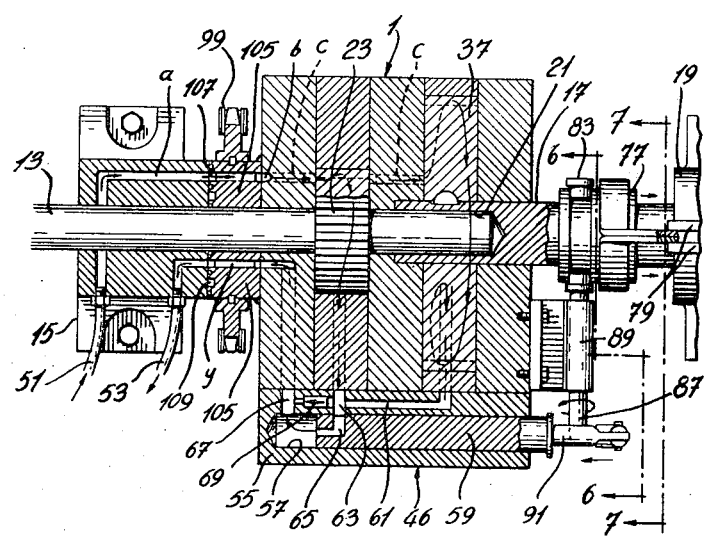
FIG. 2 is a cross-sectional view taken along a horizontal plane through the control valve.
Figure 3:
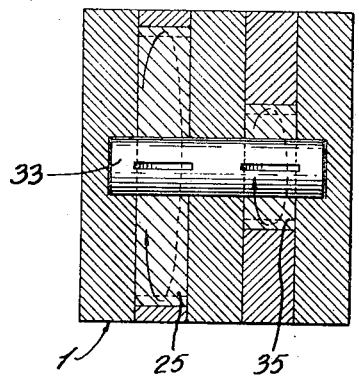
FIG. 3 is a cross-sectional view on a horizontal plane through the intermediate shaft.

FIGS. 6 and 7 are views taken in planes extending along lines 6—6 and 7—7, respectively, of FIG. 2;

FIG. 8 is a side elevation view of the other gear case.

Figure 1:
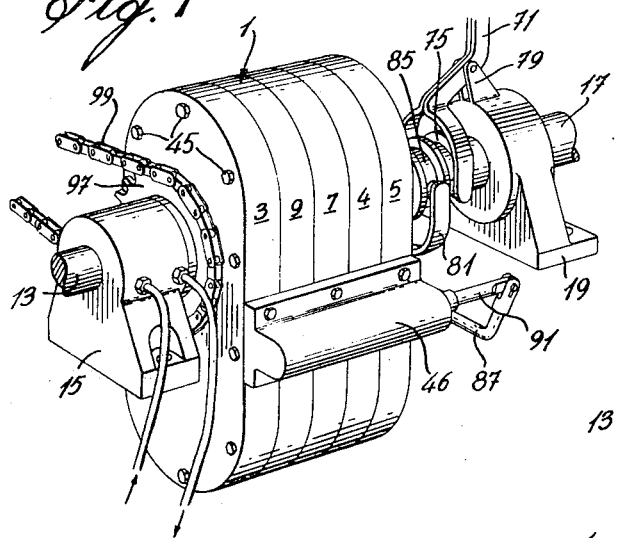
FIG. 1 is a perspective view of a transmission according to the invention shown connected to an input and an output shaft.
Figure 9:
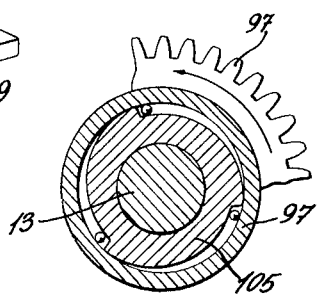
Figure 4:
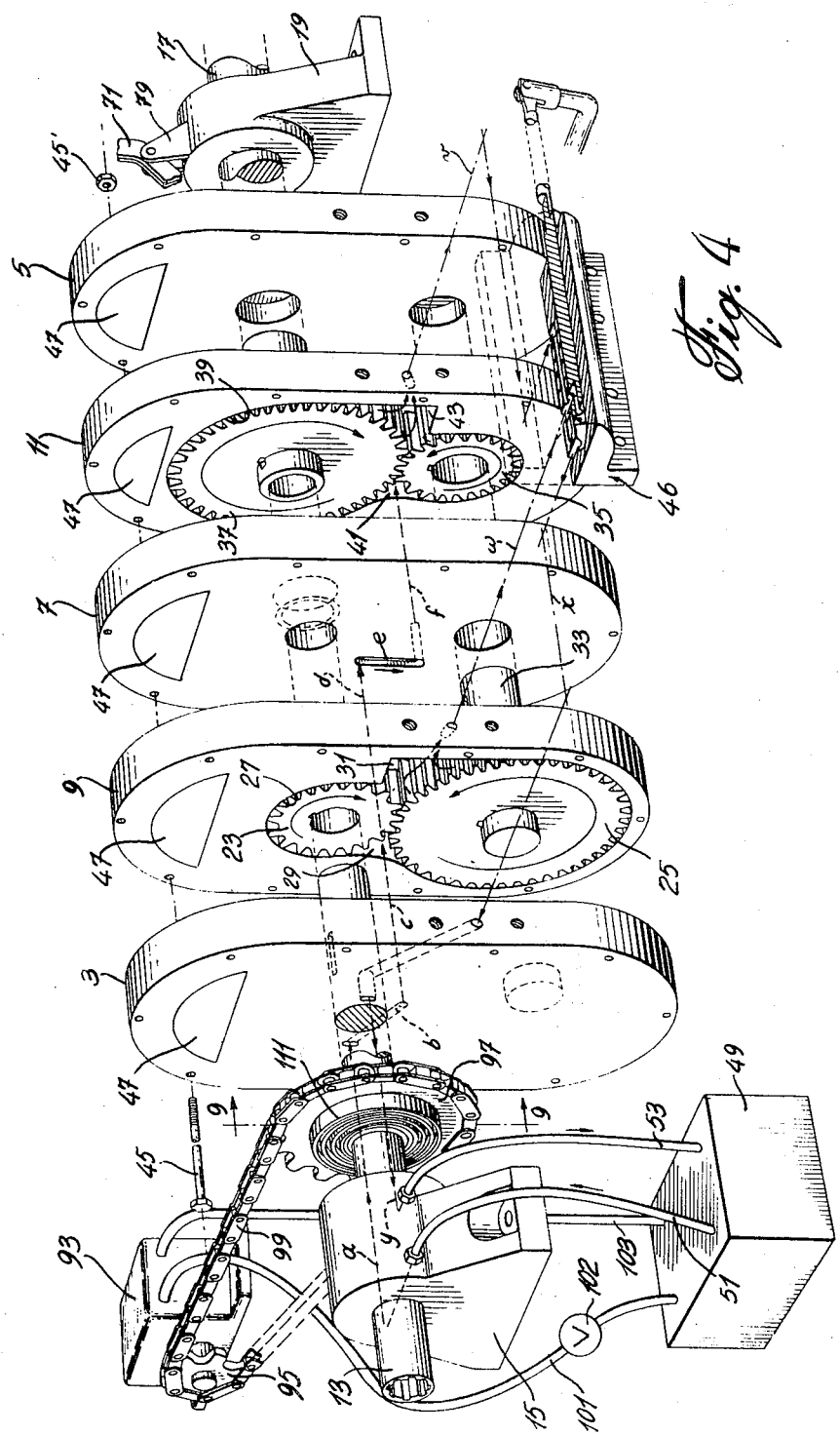
FIG. 4 is an exploded view of the transmission of the invention.

FIG. 9 is a cross-sectional view taken along line 9—9 of FIG. 4.

With reference to the drawings, the transmission comprises a casing 1 formed of a plurality of generally flat face-abutting sections, including two outer sections 3 and 5 (FIG. 4), an intermediate section 7 and two sections in the form of gear cases 9 and 11 disposed between sections 3, 7 and 5. Power is applied to a driving shaft 13 journalled in a bearing 15 and transferred to a driven shaft 17 journalled in a bearing 19. As shown in FIG. 2, the shafts extend through the casing 1 and are mounted in coaxial relationship while the driven shaft 17 is formed with an open bore 21 into which the driving shaft 13 is slidably received.

A first set of meshing gears 23, 25 is housed within a suitable cutout 27 of the gear case 9 defining therewith, at the meshing junction, an inlet cavity 29 and an outlet cavity 31. Gear 23 is secured on shaft 13, for rotation therewith, by any conventional means such as by a key extending in suitable transverse keyways in the gear 23 and the shaft 13.

Likewise, gear 25 is fixed onto an intermediate shaft 33 for rotation therewith, the latter extending successively through the intermediate section 7 of the casing 1 and through a gear 35 to which it is secured for rotation. The latter is in mesh with a gear 37 fast on driven shaft 17, the two gears 35, 37 being received in a cutout 39 of the gear case 11 and defining therewith at the meshing junction an inlet cavity 41 and an outlet cavity 43. Casing sections 3, 5, 7, 9 and 11 are clamped together by means of a series of bolt and nut assemblies 45, 45' with suitable gasket means (not shown) to prevent escape of oil from the gear cases 9 and 11.

The gears shown are in a 1:5 ratio.

As the casing 1 is intended to be brought into rotation during operation of the transmission, appropriate counter-weights 47 are provided in each casing section opposite the gears 25, 35.

As described above, the gear cases 9 and 11 and gears 23, 25, 35, 37 therein are apt to act as gear pumps, as will be explained hereinafter.

A closed hydraulic circuit interconnects the cavities 29, 41, 31, 43 and includes a pressure control valve 46, the circuit being constructed and arranged so that operation of valve 46 allows control of the pressure condition in the cavities 29, 41, 31, 43 to control the conditions of application of the driving torque from shaft 13 to the driven shaft 17, as will be explained hereinafter.

As best illustrated in FIG. 4, this hydraulic circuit comprises a tank 49 filled with oil, a feeding conduit 51 and a return system including a return conduit 53.

The feeding conduit 51 leads from the oil tank 49 through the bearing 15 and successively into the inlet cavities 29 of gear case 9 and 41 of gear case 11. The various branches of this feeding conduit can be traced in FIG. 4 by the small letters a, b, c, d, e and f.

The return system comprises the lines v and w leading from the outlet cavities 43, 31, respectively, to the valve 46 while lines x and y lead into the conduit 53 into the oil tank 49.

When all four gears 23, 25, 35 and 37 rotate, oil is drawn from the oil tank 49 through the feeding conduit 51 into the inlet cavities 29 and 41 and drawn around the gears 23, 25, 35 and 37 into the outlet cavities 31 and 43, thence back into the oil tank 49 through the return system.

Control valve 46 is secured to the casing by any known means and comprises a body 55 formed with a cylindrical bore 57 into which a piston 59 is slidably displaced. The return line v includes an L-shaped passage 61 through the body 55 opening into a radial passage 63 which is part of the line w and which leads into the bore 57. The forward end of the piston 59 is formed with an L-shaped duct 65 intended, as shown in FIG. 2, to lead passages 61 and 63 into the bore 57 in one position of the piston 59. Another radial passage 67 of the return line x opens into the bore 57.

Finally, a check valve (not shown) is provided in a passage 69 to allow passage of oil only between radial passages 63 and 67 when an overpressure exists in the return circuit as will be explained hereinbelow.

The piston 59 is operated by means of a leverage system illustrated in FIGS. 1, 2, 4, 6 and 7. As can be seen, this system comprises an actuating lever 71 having a forked end provided with inturned lugs 73 (FIG. 7) received in a first circumferential groove 75 (FIG. 1) of a sleeve 77 (FIG. 2) slidably mounted on the driven shaft 17. Actuating lever 71 is pivoted, intermediate the ends thereof, on a bracket 79 upstanding from the top of bearing 19. A second lever 81 has a forked end with inwardly turned lugs 83 received in a second groove 85 of the collar 77. The other end of the forked lever 81 is fixed at the end of an L-shaped arm 87 journalled into a bracket 89 mounted on the casing 1. The upturned end of the arm 87 is pivoted at the outer end of the rod 91 of the piston 59.

With the above description in mind, it will be understood that actuation of the lever 71 will cause sliding of the collar 77 and pivoting of the forked lever 81 which, in turn, will cause pivoting of the arm 87 and reciprocation of the piston rod 91, thus causing like reciprocation of the piston 59 in the bore 57.

In a preferred embodiment of the invention, I have contemplated to provide means to stop rotation of the casing 1 in a manner to be described hereinafter. The stopping means is a gear pump 93 driven into rotation by means of a first sprocket wheel 95, a second sprocket wheel 97 and a sprocket chain 99. Oil is pumped from the oil tank 49 into the gear pump 93 by an inlet pipe 101 having a shut-off valve 102 thereacross and return means through pipe 103.

As best illustrated in FIGS. 2 and 9, the sprocket wheel 97 is part of a unidirectional clutch of which the inner member 105 is slidably mounted on the driving shaft 13 while being fast with the outer section 3 of the casing 1. This unidirectional ball clutch, which is of conventional construction, will allow the casing 1 to drive the sprocket wheel only in counterclockwise rotation as will easily be gathered from FIG. 9. When casing 1 rotates clockwise, then the inner member 105 of the unidirectional clutch will have no action on the sprocket wheel 97.

In view of the relative rotation of the inner member 105 with respect to the bearing 15, two circumferential grooves 107, 109 are formed on the face of the member 105 in contact with the bearing 15. These will ensure permanent communication between the portions of lines a and y across the bearing 15 and the member 105. Also, a series of gaskets, identified in block in FIG. 4 by numeral 111, are provided to avoid oil leaks between the bearing 15 and the member 105.

The transmission operates as follows.

Let us assume that the valves 46 and 102 are open and that a load is applied on the driven shaft 17. The driving shaft 13 then causes rotation of the gears 23, 25 and 35 but, because of the load on the shaft 17, the last gear 37 remains idle and the gear 35 as well as the casing 1 are forced to turn around it as satellites. If it is assumed that the driving shaft 13 rotates clockwise, then the casing 1 rotates counterclockwise. Also, if, as assumed previously, the gears are in a 5:1 ratio, then the casing 1 will rotate at one-fifth the speed of the shaft 13 since it gravitates around the gear 37.

Because of the unidirectional clutch 105, rotation of the casing 1 will cause actuation of the gear pump 93 although the pump will run on no load, its circuit formed of pipe 103, tank 49 and pipe 101 being unobstructed. Similarly, valve 46 being open, oil will flow freely in the circuit described above so that the driven shaft 17 will remain idle.

Now, if it is desired to apply a powerful starting torque to the driven shaft 17 and bring the latter to its cruising speed in the shortest possible time, then valve 102 is completely shut off, causing immediate stop of the gear pump 93 and consequently stopping the gear casing 1 since the inner member 105 of the unidirectional clutch (FIG. 9) is solid with the casing 1. Since the gear 35 can no longer gravitate around the gear 37, the latter and the shaft 17 starts to rotate against the load on the shaft 17 until the speed of the latter becomes one-fifth that of the shaft 13 and it remains at that speed for as long as there is no pressure build-up in the hydraulic circuit and the valve 102 remains closed. During that time, the piston 59 in the bore 57 of the valve 46 is in the position shown in FIG. 2.

Now, if lever 71 is actuated so as to move the piston 59 to the left to partially block off the radial passage 63, pressure builds up in the outlet cavities 31 and 43 forcing gear 35, always rotating at the same speed, to start gravitating again around gear 37 but this time clockwise, speeding up the rotation of the gear 37 and likewise that of the driven shaft 17 while causing clockwise rotation of the casing 1. At the limit, when the piston 59 of the valve 46 is pushed leftward sufficiently to cut off radial passage 63, the pressure builds up sufficiently completely to freeze gears 35 and 37 and prevents relative rotation. Then, the gear 37, the driven shaft 17 and the casing 1 rotate at the speed of the driving shaft 13.

Obviously, the torque ratio between the shafts 13 and 17 varies inversely as the speed ratio.

From the above description, it will be appreciated that the complete operation from idle to full speed of the shaft 17 can also be obtained by the sole operation of the valve 46, the shut-off valve 102 being opened to allow free counterclockwise rotation of the casing at start-up.

Any overpressure in the hydraulic circuit is bled to the oil tank 49 through the check valve 69.

It will also be asppreciated that smooth and flexible variations in speed and torque ratios between the shafts 13 and 17 can be obtained at all times by the simple actuation of the control valve 46 through the lever 71.

Finally, it is obvious that the ratio of 1:5 mentioned above, in relation to the gear system, is only given as an example and that the invention is applicable to systems having a different gear ratio.

I claim:

1. A transmission to interconnect a driving shaft and a driven shaft comprising:
   a. a casing including two fluid-tight gear cases;
   b. a pair of gears in each case meshing with one another at a meshing junction and defining with the corresponding case and at the meshing junction thereof a fluid inlet cavity and a fluid outlet cavity whereby said cases and gears are apt to act as gear pumps;

c. means to mount one gear of one pair on said driving shaft to be rotated thereby and one gear of the other pair on said driven shaft to drive said driven shaft into rotation;

d. an intermediate shaft and means mounting the remaining gears of said pairs on said intermediate shaft for rotation in unison, and e. a closed hydraulic circuit interconnecting said cavities and including a pressure control valve constructed and arranged so that operation of said valve will control the pressure condition in said cavities to control the conditions of application of the driving torque on the driven shaft.

2. A transmission as claimed in claim 1 wherein said hydraulic circuit comprises:

a hydraulic tank;

feeding conduit means leading from said tank and interconnecting said inlet cavities, and return conduit means interconnecting said outlet cavities and said valve, on the one hand, and said valve and said tank, on the other hand.

3. A transmission as claimed in claim 2 wherein said valve is mounted on said casing and comprises:

a body formed with a cylindrical bore;

a piston mounted for sliding displacement in said bore;

said return conduit means including passages in said body leading into said bore and a duct in said piston so constructed and arranged as to allow said piston, by sliding displacement thereof, selectively to control flow of hydraulic fluid between said cavities and said tank.

4. A transmission as claimed in claim 3 including manually operable means connected to said piston to cause sliding thereof to operate said valve.

5. A transmission as claimed in claim 2 wherein said shafts are coaxial, said driven shaft is formed with an open bore at one end and said driving shaft is slidably received in said bore and wherein said one gear of said other pair is fixedly mounted on said bored end of said driven shaft.

6. A transmission as claimed in claim 2 wherein, under load condition and with said valve open and said hydraulic circuit unobstructed for free flowing of fluid therein, the second gear of said other pair gravitates around the gear fixed to said driven shaft in a direction reverse that of said driving shaft bringing said casing in like rotation and means to stop said casing rotation to force said driven shaft gear into rotation to rotate said driven shaft.

7. A transmission as claimed in claim 6 wherein said stopping means is a gear pump assembly comprising: a gear pump; inlet and outlet conduits connecting said pump to said tank and a shut-off valve in one of said conduits, and driving means for actuating said pump including a wheel mounted on said driving shaft and a unidirectional clutch in association with said casing and said wheel to cause the latter to rotate only in a direction reverse that of said driving shaft whereby when said valve is shut off, said pump stops rotating along with said wheel thus stopping the rotation of said casing.

* * * * *